(12) United States Patent
Wood

(10) Patent No.: X5386
(45) Date of Patent: Mar. 3, 1829

(54) BRICK & TILE

(76) Inventor: James Wood

United States Patent Patent No.: X5386

James Wood of the County of Rockland N. York.
No. 97.
Letters Patent

The schedule referred to in these Letters Patent, and making part of the same.

To all to whom these presents shall come,
James Wood of the County of Rockland in the State of New York a citizen of the United States sends greeting.

Be it known that I the said James Wood have invented a new and useful improvement in the art of Manufacturing bricks and tile; the process is as follows Take of common or Anthracite coal unburnt such quantity as will best suit the kind of clay to be made into brick or tile and mix the same when well pulverized with the clay before the same is moulded. That clay which requires most burning will require the greatest proportion of coal dust. The exact proportion cannot therefore be specified but in general three fourths of a bushel of coal dust to one thousand bricks will be correct. Some clay may require one eighth more and some not exceeding a half bushel. The benefits resulting from this composition are the saving of fuel and the more general diffusion of heat through the kiln by which the whole contents are more equally burnt; the process of burning is also accelerated by the coal dust, If the heat is raised too high the brick will swell and be injured in their form If the heat is too moderate the coal dust will be consumed before the desired effect is produced extremes are therefore to be avoided.

I claim as my invention the using of fine anthracite coal or coal dust with clay for the purpose of making Brick and tile as aforesaid and for that only Claim Letters Patent from the United States.

Witnesses Dated 9th Nov. 1836 — James Wood.
W. Silliman
Jauncey W. Troutman

Exd
Chs.M.

Patented March 3. 1829. Reissued Dec. 2, 1836